PHASE MODULATOR USING A VARACTOR PASSIVE T-NETWORK
Filed May 26, 1964
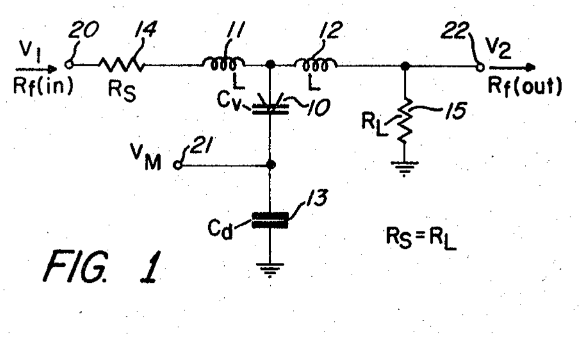
FIG. 1
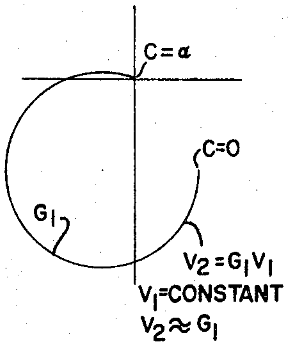
FIG. 4
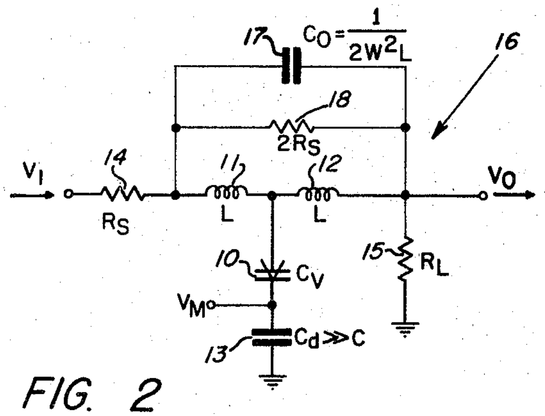
FIG. 2
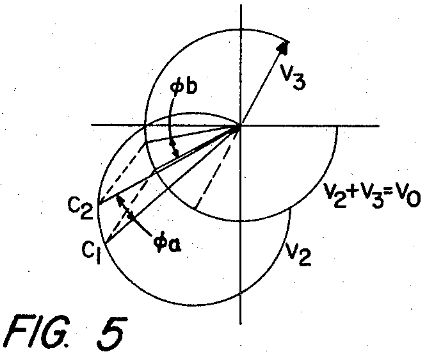
FIG. 5
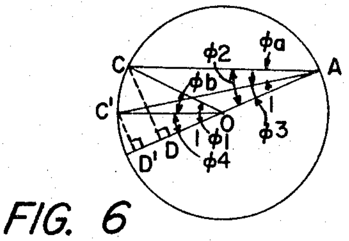
FIG. 6
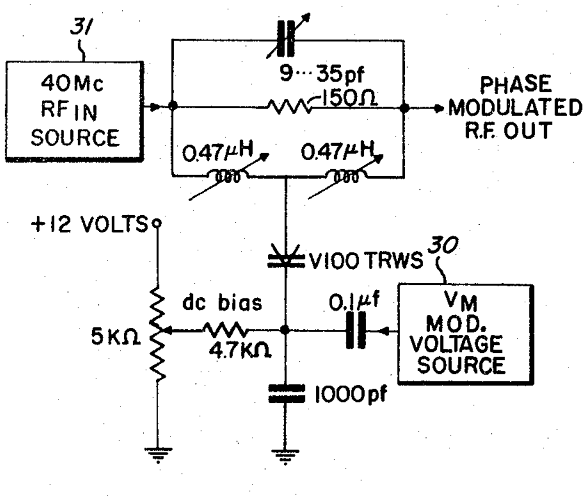
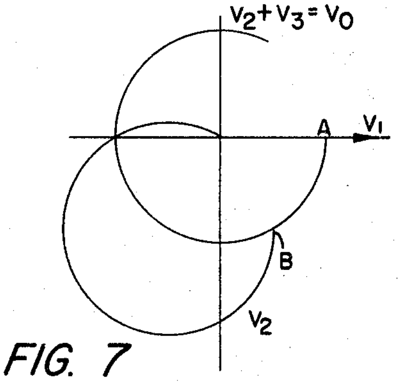
FIG. 7
FIG. 3
INVENTOR
RENÉ E. T. BRUTSCH
BY Donald Brown
ATTORNEY United States Patent Office 3,319,188

Patented May 9, 1967

3,319,188

PHASE MODULATOR USING A VARACTOR PASSIVE T-NETWORK

René E. T. Brutsch, Schaffhausen, Switzerland, assignor to Raytheon Company, Lexington, Mass., a corporation of Delaware Filed May 26, 1964, Ser. No. 370,167
6 Claims. (Cl. 332—30)

This invention relates to a modulator and, more particularly, a phase modulator which is capable of operating over a wide frequency range, providing high modulation index and low distortion. Additionally, this system provides a constant amplitude output with a double phase variation for a given input modulation signal, thus providing a system which does not require the use of limiters following the phase modulator as is normal with the prior art systems.

Phase modulation has heretofore been accomplished in several ways. In some of the prior art systems, special vacuum tube circuits have been used for producing phase modulation. A typical example is the well known reactance tube modulator wherein a vacuum tube is connected so as to produce a phase shift similar to that produced by a reactance in a circuit. Another well known example is the quadrature type of circuit wherein two vacuum tubes are used to obtain a resulting reactance effect to create the phase shift. Vacuum tube circuits of this character however, provide a signal with a considerable amount of amplitude modulation superimposed upon the phase-modulated signal, thus requiring the use of some type of limiting device to remove the effects of the unwanted amplitude modulation.

Accordingly, it is the principal object of this invention to provide a new and improved phase modulator.

It is an additional object of this invention to provide a modulator comprised of a passive LC network in combination with a device which provides an impedance which varies as a function of voltage across it and, additionally, varies in a manner so as to compensate for the nonlinear phase relation provided by the passive network.

It is a further object of this invention to provide a phase modulator having passive means for suppressing amplitude modulation.

It is another object of this invention to provide a phase modulator utilizing a varactor diode.

In accordance with the phase modulator of this invention, a passive network is coupled in circuit with a voltage variable impedance or reactance. More particularly, the phase modulator includes a passive network which is coupled in circuit with a nonlinear voltage variable capacitor, such as a varactor diode, said modulator further including an impedance coupled in circuit with the aforementioned for suppressing amplitude modulation while at the same time providing an increase in phase modulation sensitivity.

Other objectives and features of this invention will become apparent from the following description taken in connection with the following drawings wherein:

FIG. 1 is a circuit diagram of a preferred phase modulator according to the invention;

FIG. 2 is a circuit diagram of the preferred phase modulator according to this invention including an impedance coupled to said circuit for providing amplitude modulation suppression;

FIG. 3 is a circuit diagram according to this invention showing the values of the components for the circuit of FIG. 2;

FIG. 4 shows a plot of the transfer function of the circuit of FIG. 1;

FIG. 5 shows the effect of including means for suppressing amplitude modulation on the transfer function plotted in FIG. 4;

FIG. 6 shows the phase shift obtained with and without amplitude modulation suppression; and FIG. 7 shows a plot of the transfer function utilized for determining the reactive component required to provide amplitude modulation suppression.

The circuit illustrated in FIG. 1 represents the preferred embodiment of a phase modulator according to this invention. In the preferred embodiment, a varactor diode is utilized as a nonlinear voltage variable capacitor in conjunction with a passive network in order to provide a phase modulator having a linear phase variation of a carrier frequency in accordance with a modulation voltage applied to said varactor. The preferred passive circuit or network, shown in FIG. 1, is in the T configuration. It is to be understood that other configurations, such as $\pi$ configuration or other variations of the $\pi$ or T, could be utilized for the same purpose.

The modulator circuit comprises the varactor diode, noted as $C_v$ numbered 10, is coupled in one leg of the T configuration to a capacitor $C_d$ numbered 13. The capacitance $C_d$ is a high frequency bypass capacitor and accordingly $C_d$ is $\gg C_v$. Coupled to the other end of the varactor diode 10 are two inductors noted as 11 and 12. Inductor 11 is coupled through a resistance $R_s$ numbered 14, which is equal to the source resistance. Coupled to the inductor 12 is a load resistance $R_L$ numbered 15. The load resistance, in this instance, is assumed to be equal to the source resistance. An input carrier signal of a frequency $w$ is applied at terminal 20. A modulating low frequency signal is applied at terminal 21 so as to vary the capacitance of the varactor diode 10. At terminal 22, an output voltage $V_2$ is obtained. Voltage $V_2$ is equal to the carrier frequency signal as phase modulated by the application of $V_m$.

For a description of the operation of this device, the characteristics of the varactor will first be described. The varactor is a semiconductor device which can be used as a voltage dependent capacitor between forward conduction and the reverse breakdown voltage. The capacitance as a function of the voltage across the varactor can be described by the following law:

$$C=\frac{g}{V^t}$$

$C$=capacitance
$g$=constant factor
$V$=voltage across varactor
$t$=0.3 . . . 0.5 (depending on type of varactor)

From this equation, it can be seen that the capacitance of the varactor is a nonlinear function of the applied voltage. This nonlinearity can be used for compensating the nonlinear relation between the phase and the change of capacitance of a network consisting of inductors, resistors and capacitors. The compensation provided by the varactor diode results in a linear relation between the phase shift through the network and the voltage applied across the varactor. Thus, by applying a modulating voltage to the varactor diode, a carrier frequency applied to the network can be phase-modulated in accordance with the magnitude of the modulating voltage.

Referring again to FIG. 1 and calculating the transfer function of the network, the following result is obtained:

$$G_1=\frac{V_2}{V_1}=\frac{1}{2-2w^2LC+j\left[2\frac{wL}{R}+wC\left(R-\frac{w^2L^2}{R}\right)\right]}$$

where $V_1$ is the input signal of a carrier frequency $w$ provided at terminal 20, $V_2$ is the output frequency obtained from the network at terminal 22. The above is obtained assuming that the modulating voltage provided at terminal 21 is of a much lower frequency than the signal frequency that is to be modulated. Plotting the transfer function of the network of FIG. 1 as a function of the capacitance in a network, the curve of FIG. 4 is obtained. This curve shows that the gain $G_1$ varies as a function of the capacitance in the network. Since $V_2=G_1V_1$ and $V_1$ is a constant amplitude, this curve also represents the voltage $V_2$. Thus, while the circuit of FIG. 1 provides a high degree of phase modulation, it also provides a phase-modulated signal having a high degree of amplitude modulation. As one of the major improvements of the preferred embodiment of this invention, a network is coupled in circuit with the structure shown in FIG. 1 in order to suppress the amplitude modulation present in the circuit of FIG. 1.

The improved modulator of this invention is shown in FIG. 2. In this circuit an impedance, shown generally at 16, is coupled across the series inductors 11 and 12 in order to provide suppression of amplitude modulation encountered during the phase modulation of the carrier frequency provided to terminal 20 of FIG. 1. The impedance 16 is a parallel connected resistor-capacitor combination made up of capacitor 17 and resistor 18. The rationale behind the addition of this impedance is as follows: Noting that the transfer function, noted as $G_1$, is represented by a circle, the unwanted amplitude modulation can be prevented by shifting the center of the circle $G_1$ into the origin of the complex plane. This is shown in FIG. 5. A shifting of the circle $G_1$ to the origin will provide a transfer function with a constant absolute value of attenuation and thus no amplitude modulation. In order to move the transfer function to the origin of the complex plane, a voltage $V_3$ is added to the output voltage $V_2$; $V_3$ being proportional to the voltage $V_1$. The amplitude of the voltage $V_3$ has to be equal to the radius of the circle $V_2$ and of a phase opposite to the phase of the line from the origin of the complex plane to the center of the circle $V_2$. Further, by ridding the circuit of FIG. 1 of the unwanted amplitude modulation, we gain in phase sensitivity by shifting the circle. By changing the capacitance from $C_1$ to $C_2$, the phase shift is $\phi_a$ for one case and $\phi_b$ for the other. The relation between $\phi_a$ and $\phi_b$ can be found as $\phi_b=2\phi_a$, and can be seen from FIG. 6. The proof for this relationship is found from FIG. 6 as follows:

Assume radius of circle=1
$AD=1+\cos\phi_1$
$DC=\sin\phi_1$
$(AC)^2=(AD)^2+(DC)^2=2(1+\cos\phi_1)$
AD also equals $AC\cos\phi_2$ $$\cos\phi_2=\frac{AD}{AC}=\frac{1+\cos\phi_1}{\sqrt{2(1+\cos\phi_1)}}=\sqrt{\frac{1+\cos\phi_1}{2}} \quad (1)$$

Relation (1) is the trigonometry identity for half angles—i.e., $$\cos 1/2\,\phi=\sqrt{\frac{1+\cos\phi}{2}}$$

$$\therefore \phi_1=2\phi_2$$

From above, $\phi_4=2\phi_3$
$\phi_b=\phi_1-\phi_4=2\phi_2-2\phi_3$
$\phi_a=\phi_2-\phi_3$
$\therefore \phi_b=2\phi_a$ Thus, by adding the voltage $V_3$ so as to shift the circle representing the gain $G_1$ of the circuit towards the origin of the complex plane, the change in the phase angle increases for a constant change of capacitance. The addition of this voltage $V_3$ therefore provides a two-fold improvement in the circuit of FIG. 1 inasmuch as a suppression of amplitude modulation is obtained while simultaneously increasing the sensitivity of the circuit. In order to simply add the voltage $V_3$ to the voltage $V_2$ in such a manner so as to provide attenuation of the voltage $V_2$, a resistance equal to $2R_s$ is chosen. The resistance $2R_s$ is chosen by noting the radius of the voltage $V_3$ required is one-half the diameter of the circle which is equal to the maximum of $G_1$.

Since the only power losses in the circuit occur in the source and the load resistors, there always exists a capacitance for all values of inductance and resistance so that maximum power is dissipated in the load resistance $R_L$. The maximum voltage ratio is, therefore, $$G_1=\frac{V_2}{V_1}=1/2 \text{ or } V_2=\frac{V_1}{2}$$

This is the case for $R_s=R_L$. By determining that the radius required is one-half of the diameter and since the diameter is equal to a voltage of $V_1/2$, the radius of the voltage $V_3$ required is equal to $V_1/4$. After shifting the circle representing $G_1$ into the origin of the complex plane, the output voltage will be equal to $$V_2+V_3=V_0=\frac{V_1}{4}$$

In order to get this voltage equal to the loss or attenuation $V_1/4$, a resistance must be inserted into the modulator circuit. To provide this output voltage which is equal to $V_1/4$, it is easily determined that the resistance, which must be inserted, is equal to $2R_s$ since all the losses in the circuit occur in the resistors.

Now to determine the value of C required to be inserted in the network in order to obtain this voltage cancellation provided by the voltage $V_3$, and noting that if all the reactive components are matched, there will be no phase shift between the output voltage $V_0$ and the input voltage $V_1$, shown as point A on FIG. 7. For the uncompensated circuit, the corresponding point to A is point B, also shown in FIG. 7. The real part of point B represents the maximum for all values of $V_2$. From $G_1$ we find:

$$(2-2w^2LC)=2 \text{ for } C=0$$

with $C=0$, the only reactance left in the circuit is an inductance of 2L. This inductance can be cancelled by connecting across a capacitor $$C_0=\frac{1}{2w^2L}$$

This is shown in FIG. 2. By calculating the transfer function, the amplitude of $V_0$; which is equal to the output voltage shown in FIG. 2, can be shown to be independent of C or, in other words, the center of the circle $G_1$ has been moved into the origin of the complex plane. Taking the transfer function $G_2$ of the network of FIG. 2, we find that $G_2$ can be represented by:

$$G_2=\frac{V_0}{V_1}=-1/4\frac{1-\frac{2}{2-w^2LC}-p\frac{L}{R}}{1-\frac{2}{3-w^2LC}+p\frac{L}{R}}$$

where $p$ is equal to a $+j\beta$ or the complex radian frequency. From this equation it can be seen that for all values of C, the gain $G_2$ has the same absolute value. Accordingly, this circuit and modulator fulfills the condition of constant amplitude of $V_0$ for any change of $C_v$ which is equal to C in the equation.

To determine the modulator circuit component L, C, and R values for maximum linear operation at the specified operating frequency, such as 40 megacycles, and a particular varactor capacitance, standard circuit analysis techniques are applicable. Although a considerable choice of circuit elements is permissible in keeping with good design practice and also depending largely on the frequencies used and the purpose of the system, the following set of approximate values has been found useful in designing the system of FIG. 2 for an input generator carrier frequency of about 40 megacycles per second with $V_m$ frequency of up to 1.5 megacycles: Varactor diode ($C_v$10)—$V_{100}$ sold by Thompson Ramo Wooldridge Inc.

$C_d$13—1,000 pf.
L11 and 12—.47 mf.
Resistance 18—150 ohms.
$C_v$—9 to 35 pf.

This circuit is shown in FIG. 3 with a biasing voltage and an input capacitance coupled to a voltage modulating source 30. There is also shown a 40 megacycle radio frequency source 31 coupled to the circuit.

Although a system for producing phase modulation has been shown, it is to be understood that by integrating the carrier frequency or the RF input signal prior to providing this signal to the phase modulator, a frequency-modulated signal output from this device can be obtained. This technique is disclosed in the book, "Active Networks," by Vincent C. Rideout, published by Prentice-Hall, Inc., in 1954 in chapter 11.

Accordingly, it is desired that this invention not be limited except as defined by the appended claims.

What is claimed is:

1. A phase modulation system comprising in combination: a carrier frequency source; a modulating voltage signal source; a passive T-network connected to said carrier frequency source and including a pair of series-connected inductors and a shunt capacitor coupled to the junction between the inductors; a varactor diode coupled to said modulating voltage signal source and connected between the shunt capacitor and the junction between the inductors, the capacitance of said diode varying non-linearly as the modulating signal is applied to said diode; and an impedance means connected across said inductors for suppressing any amplitude modulation from being superimposed upon the phase modulated output signal and for increasing phase sensitivity.

2. A phase modulation system comprising a carrier frequency source, a modulating voltage signal source, a passive T-network including an input resistance connected to said carrier frequency source, a pair of series-connected inductors connected in series to said input resistance, a high frequency bypass shunt capacitor coupled to the junction between said inductors and a load resistance coupled to said inductors; a varactor diode coupled to said modulating voltage signal source and connected between said bypass capacitor and the junction between said inductors, said diode having a capacitance which varies non-linearly with the modulating signal applied thereto; a coupling impedance including a resistor-capacitor combination connected in parallel, said parallel combination connected in parallel across said series-connected inductors whereby said impedance suppresses any amplitude modulation from being superimposed upon the phase modulated output signal and increases phase sensitivity.

3. A system in accordance with claim 2 wherein said varactor diode capacitance is equal to $K_1/V^{K_2}$ where V is the modulating signal voltage applied to the diode and $K_1$ and $K_2$ are constants.

4. A phase modulation system as set forth in claim 2 wherein said input resistance is equal to the carrier frequency source resistance.

5. A phase modulation system as set forth in claim 2 wherein said input resistance and said load resistance are approximately equal.

6. A phase modulation system as set forth in claim 2 wherein said resistance of said coupling impedance is equal to twice the input resistance and said capacitance of said impedance is equal to $1/2w^2L$ where $w$ is the carrier frequency and L is the inductance of each of the inductors.

References Cited by the Examiner

UNITED STATES PATENTS

| | | | |
|---|---|---|---|
| 3,153,206 | 10/1964 | Fisher | 332—30 X |
| 3,204,198 | 8/1965 | Bachnick | 332—30 X |

ROY LAKE, *Primary Examiner.*

A. L. BRODY, *Examiner.*